United States Patent
Bryce

(10) Patent No.: US 8,006,345 B1
(45) Date of Patent: Aug. 30, 2011

(54) HINGE FOR ADJOINING RODS

(76) Inventor: Daniel P. Bryce, Thornton, CO (US)

( * ) Notice: Subject to any disclaimer, the term of this patent is extended or adjusted under 35 U.S.C. 154(b) by 225 days.

(21) Appl. No.: 12/401,383

(22) Filed: Mar. 10, 2009

Related U.S. Application Data

(60) Provisional application No. 61/035,806, filed on Mar. 12, 2008.

(51) Int. Cl.
*E05F 1/14* (2006.01)
(52) U.S. Cl. ........................... 16/285; 16/319
(58) Field of Classification Search ............. 16/285, 16/324, 374, 375, 328, 342, 319, 326, 321, 16/332, 349; 135/114; 403/102, 91, 96, 403/83–84, 101, 109.8, 359.5; 5/99.1, 102, 5/201–202
See application file for complete search history.

(56) References Cited

U.S. PATENT DOCUMENTS

| | | | | |
|---|---|---|---|---|
| 942,583 | A | * | 12/1909 | Neeld .............................. 403/111 |
| 2,064,839 | A | * | 12/1936 | Kroll et al. ....................... 16/324 |
| 3,950,758 | A | * | 4/1976 | Mirrione et al. ............... 343/881 |
| 4,317,289 | A | * | 3/1982 | Conn ............................... 33/498 |
| 5,046,279 | A | * | 9/1991 | Smith et al. ....................... 43/26 |
| 5,251,359 | A | * | 10/1993 | Finkl ................................ 16/349 |
| 5,867,911 | A | * | 2/1999 | Yates et al. ....................... 30/276 |
| 6,409,410 | B1 | * | 6/2002 | Huang .............................. 403/65 |
| 6,510,568 | B1 | * | 1/2003 | Drobinski et al. ................ 5/93.1 |
| 6,806,944 | B2 | * | 10/2004 | Votipka et al. ................... 355/75 |

* cited by examiner

*Primary Examiner* — Victor Batson
*Assistant Examiner* — Matthew Sullivan
(74) *Attorney, Agent, or Firm* — Rick Martin; Patent Law Offices of Rick Martin, P.C.

(57) ABSTRACT

Rod segments can be adjoined with a simple hinge. Various embodiments of hinges include locking, non-locking, spring biased open or closed, and aligned rod segments or non-aligned rod segments.

13 Claims, 5 Drawing Sheets

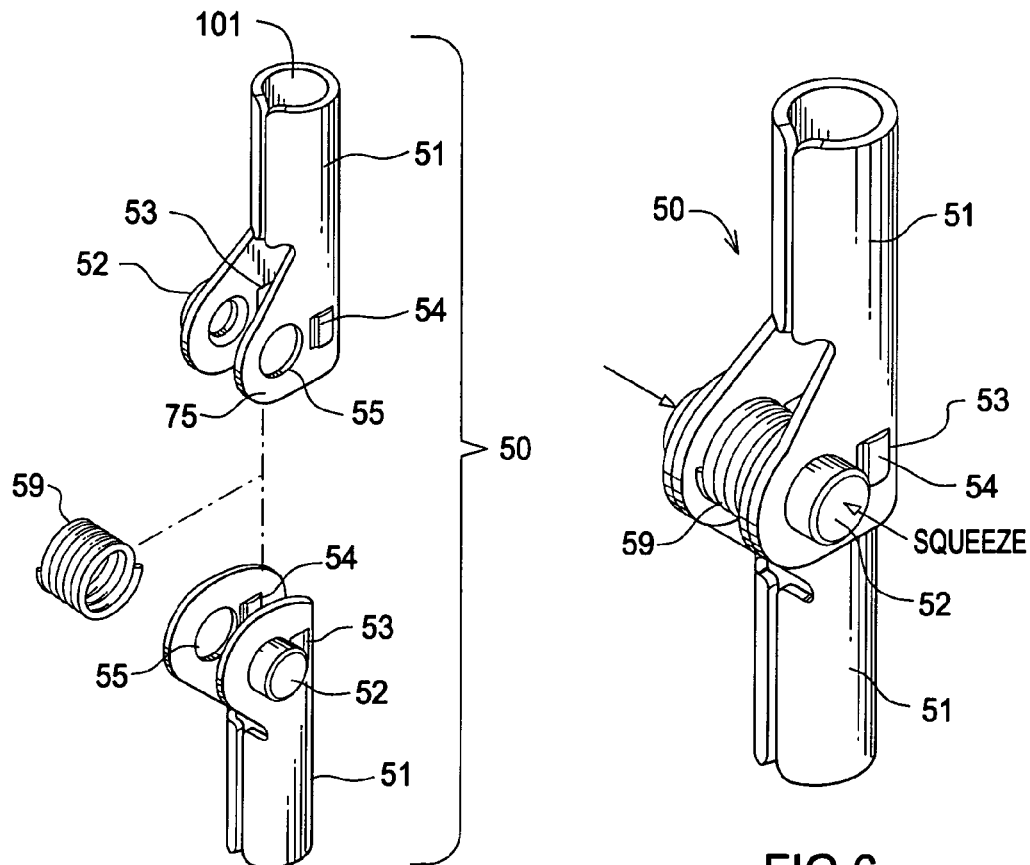
FIG.5
FIG.6
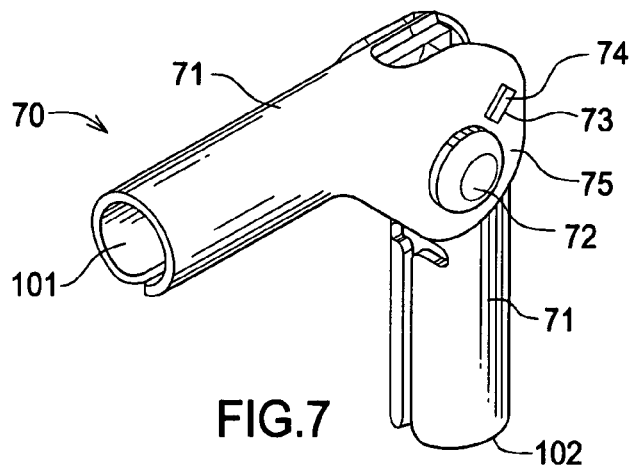
FIG.7

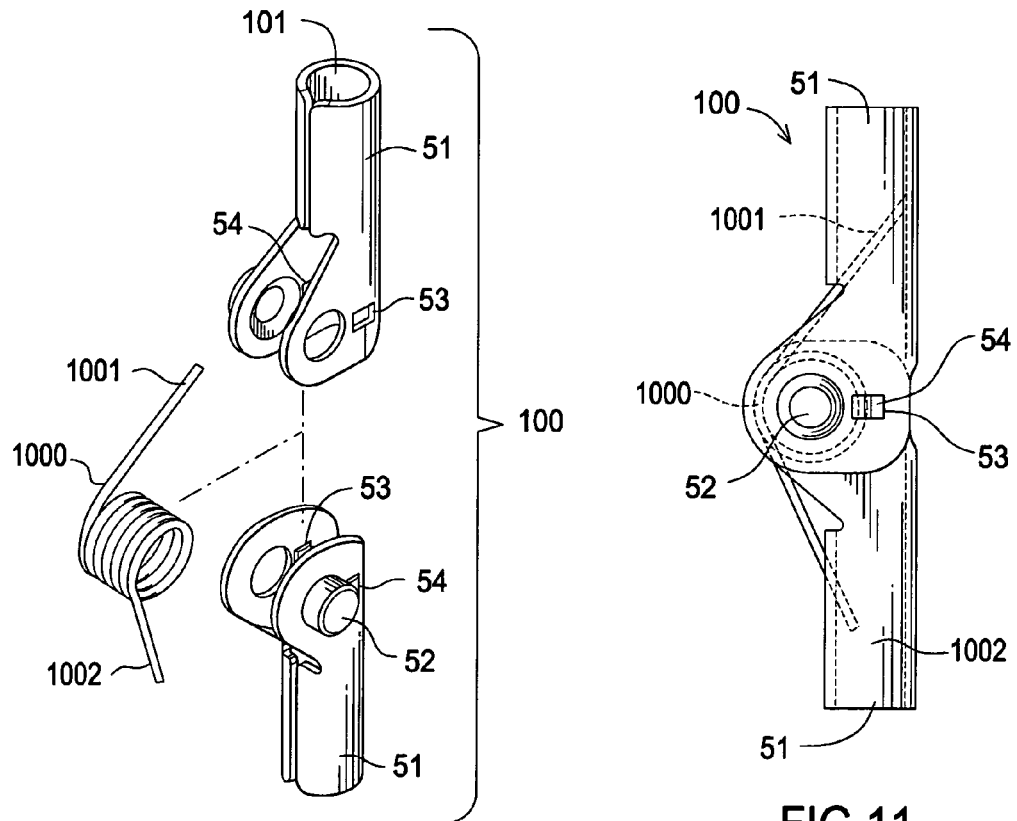
FIG.10
FIG.11
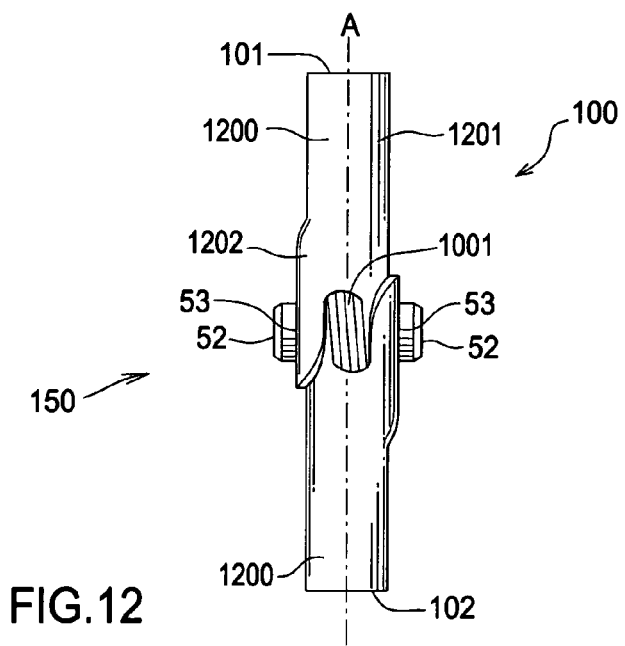
FIG.12

HINGE FOR ADJOINING RODS

CROSS REFERENCE APPLICATIONS

This application is a non-provisional application claiming the benefits of provisional application No. 61/035,806 filed Mar. 12, 2008.

FIELD OF INVENTION

The present invention relates to joining a pair of rods such as tent pole rods with a sheet metal hinge.

BACKGROUND OF THE INVENTION

Any campers know it is difficult to quickly assemble a tent using tent pole rods that have an elastic string holding rod segments together. Pushing the assembled rod through a series of tent sheaths causes the rod to buckle. It is impossible to pull back on the rod because the segments will separate and they will come apart and the elastic string will break.

Some quick assembly tent systems are available with custom hinges adjoining tent segments together. However, no known universal test pole rod is built by assembling rod segments together with simple, small, lightweight, inexpensive metal hinges. The present invention provides various models of lockable and non-locking hinges which are used to connect a series of rod segments together. A multitude of uses exist for this assembly including but not limited to tent poles.

SUMMARY OF THE INVENTION

The main aspect of the present invention is to provide a hinge member at each end of adjoining poles.

Another aspect of the present invention is to provide a locking capability for the hinge.

Another aspect of the present invention is to provide a spring bias for the hinge.

Another aspect of the present invention is to provide an axial alignment between the rods attached to the hinge.

Other aspects of this invention will appear from the following description and appended claims, reference being made to the accompanying drawings forming a part of this specification wherein like reference characters designate corresponding parts in the several views.

One embodiment of the hinge is a three part unit with a pin joining an inner dog ear pair to an outer dog ear pair. The hinge has no lock and opens to over a 180° alignment of the rods. It is preferably made of sheet metal.

Another lockable embodiment uses identical hinge members, each with an axle segment extending outbound. By squeezing the opposing axle segments, a locking prong is released from a receiver hole. A biasing spring can urge the rods either open or closed depending on the choice of springs.

Another embodiment functions like the opposing axle segment model, but adds an offset to the rod holders to keep the rods axially aligned.

BRIEF DESCRIPTION OF THE DRAWINGS

FIG. 5 is an exploded view of embodiment 50.
FIG. 6 is a side perspective view of embodiment 50 assembled and open.
FIG. 7 is a side perspective view of embodiment 70 locked at a right angle.
FIG. 10 is an exploded view of embodiment 100 which has a different spring than embodiment 50.
FIG. 11 is a side plan view of embodiment 100 in the open position.
FIG. 12 is a back plan view of embodiment 150 in the open position.

Before explaining the disclosed embodiment of the present invention in detail, it is to be understood that the invention is not limited in its application to the details of the particular arrangement shown, since the invention is capable of other embodiments. Also, the terminology used herein is for the purpose of description and not of limitation.

DETAILED DESCRIPTION OF THE DRAWINGS

Figure 1:
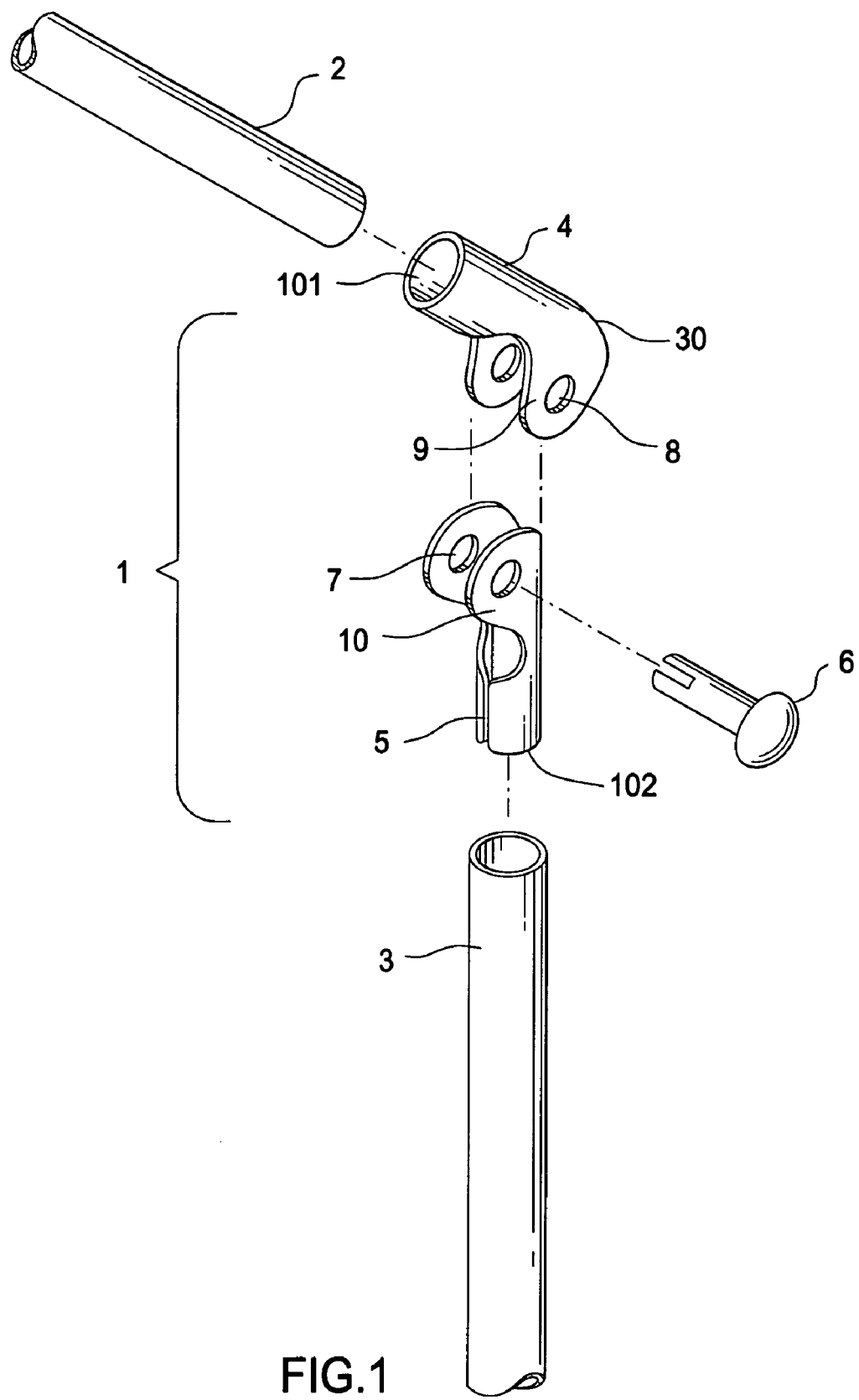
FIG. 1 is an exploded view of a three piece rod hinge.
Figure 3:
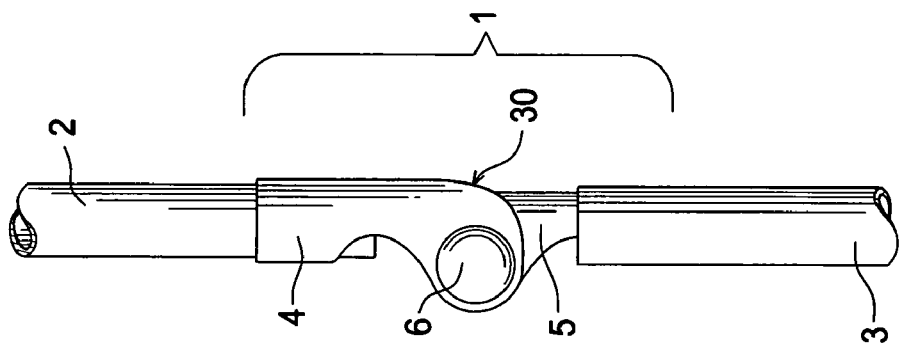
FIG. 3 is a side plan view of the FIG. 1 embodiment.
Figure 2:
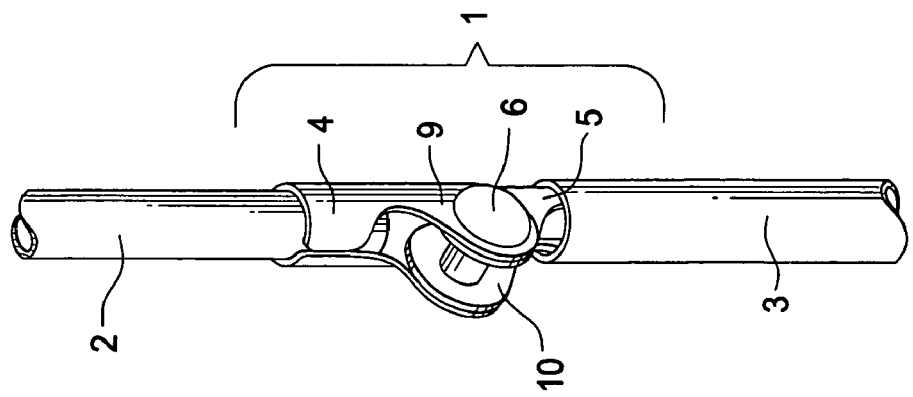
FIG. 2 is a side perspective view of the FIG. 1 embodiment shown in the open position.

FIG. 1 shows pivot arm 1 adjoining rod segments 2 and 3. Rod segment 2 fits into recess 101. Rod segment 3 fits around tip 102. Hinge 1 consists of pivot arm 4 with outer dog ears 9, each having a hole 8. Pivot arm 5 has inner dog ears 10, each having a hole 7. Holes 7, 8 align to receive pin 6 which is preferably permanently affixed to hinge 1. Hinge 1 can open more than the 180° shown in FIGS. 2, 3. At some angle (design choice) shoulder 30 will stop the opening function as it abuts pivot arm 5.

Figure 4:
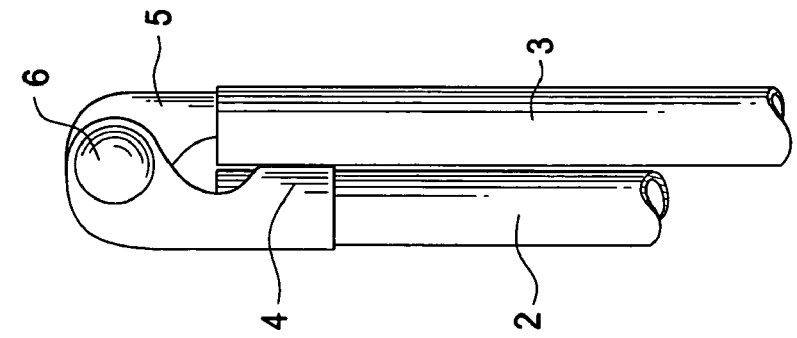
FIG. 4 is a side plan view of the FIG. 1 embodiment.

FIG. 4 shows hinge 1 closed with rod segments 2,3 substantially parallel to each other. No limitation of rod shapes exist in this invention. The rods and holes can be octagonal, square or any shape. Preferably pivot arms 4, 5 are made of sheet metal in an inexpensive forming operation.

Referring next to FIGS. 5, 6 hinge 50 can adjoin rods 2, 3 of FIG. 1. Each hinge member 51 is identical with dog ears 75. Members 51 each have a pivot hole 55 to receive axle projection 52. A hole 53 receives a lock bridge 54. Arrows SQUEEZE show how to disengage lock bridges 54 from holes 53, thereby allowing members 51 to be closed.

At the fully opened position shown in FIG. 6, lock bridges 54 are set in holes 53. The spring 59 biases members 51 apart until lock bridge 54 sets into hole 53. Axle projection 52 can be riveted to member 51 or formed therefrom.

Referring next to FIG. 7 the hinge 70 is the same as hinge 50 but for hole 73 and lock bridge 74 which are located at a midpoint of dog ear 75 to provide a locking of members 71 at a right angle. Clearly design choice can locate hole 73 and lock bridge 74 at any desired location along dog ear 75. Axle projection 72 can be formed from member 71.

Figure 8:
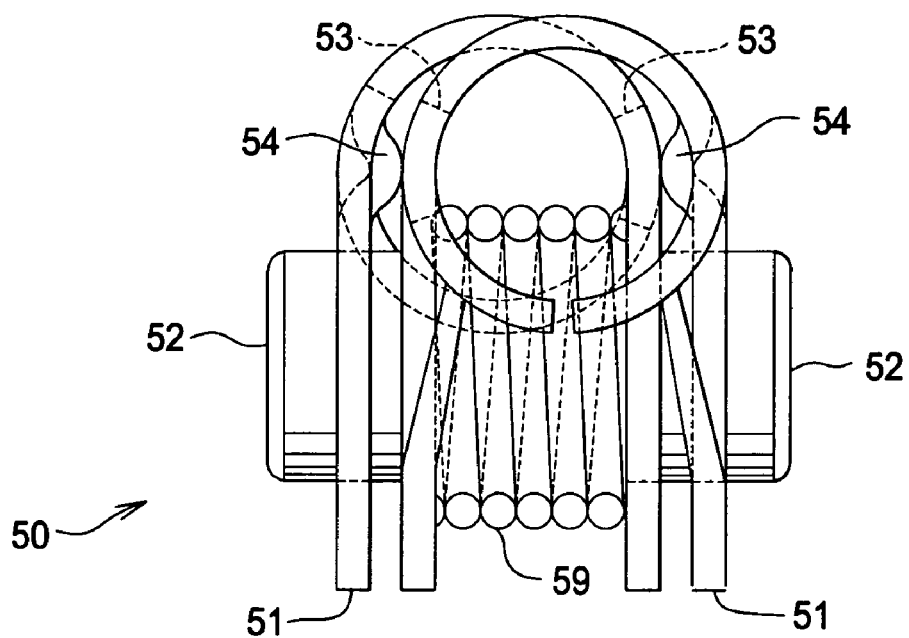
FIG. 8 is a top plan view of embodiment 50 with the spring disengaged and the hinge members unlocked.

Referring next to FIG. 8 hinge 50 is ready to be moved to any desired angle including closed because lock bridge 54 is not set into hole 53.

Figure 9:
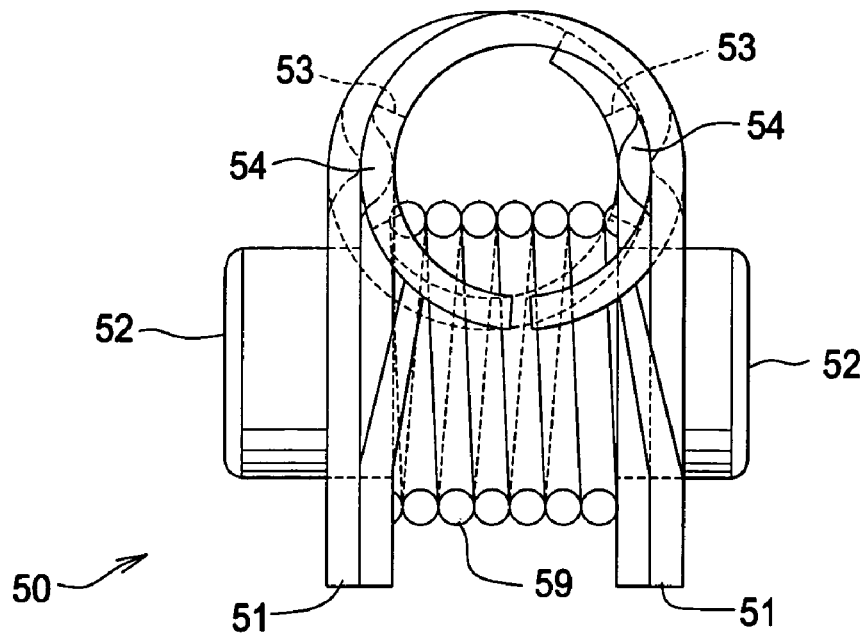
FIG. 9 is a top plan view of embodiment 50 with the spring engaged and the hinge members locked.

Referring next to FIG. 9 hinge 50 is locked with spring 59 biasing members 51 apart thus setting lock bridges 54 into holes 53.

Referring next to FIGS. 10, 11 hinge 100 consists of members 51.

Spring 1000 has legs 1001, 1002. Thus, spring 1000 biases members 51 apart as in hinge 50. However, spring 1000 also biases members 51 either open or closed based on designer's choice in how legs 1001, 1002 are biased. FIG. 11 shows legs 1001, 1002 biasing members 51 to an open position.

In FIG. 12 hinge 150 operates the same as either hinge 50 or hinge 100 depending on the choice of spring used, spring 1001 is shown, mostly hidden, but either spring 59 or 1000 could be used. Members 1200 are identical. However, shaft 1201 is offset from base 1202 so as to provide an axial alignment along axis A for recess 101 and tip 102. This provides axial alignment for rod segments 2, 3 when attached to members 101, 102.

Although the present invention has been described with reference to preferred embodiments, numerous modifications and variations can be made and still the result will come within the scope of the invention. No limitation with respect to the specific embodiments disclosed herein is intended or should be inferred. Each apparatus embodiment described herein has numerous equivalents.

I claim:

1. A hinge for joining a first rod to a second rod, the hinge comprising:
   a first hollow tubular shaft having an opening for the first rod;
   said first rod frictionally engaged inside said opening without a fastener;
   said first hollow tubular shaft having a pair of first opposing dog ears at an opposite end from the opening;
   said dog ears having a hole to receive a hinge pin;
   a second hollow tubular shaft having an opening for the second rod;
   said second rod sized larger than said second hollow tubular shaft so as to frictionally engage an outside thereof without a fastener;
   said second hollow tubular shaft having a pair of inner opposing dog ears which fit adjacent the first opposing dog ears and have aligned holes to receive the hinge pin;
   said first hollow tubular shaft having a shoulder which abuts the second hollow tubular shaft at a fully opened position;
   wherein the first and second rods abut one another substantially parallel to each other and touching each other in a fully closed position;
   wherein the tubular members are made of formed sheet metal;
   wherein said dog ears extend in only one direction radially away from said hinge pin; and
   said shoulder further comprising a curved end of the first hollow tubular shaft being co-planar with the first hollow tubular shaft.

2. A hinge for joining a first rod to a second rod, the hinge comprising:
   a first hollow tubular shaft having an opening for the first rod;
   said first hollow tubular shaft having a pair of opposing dog ears at an opposite end from the opening;
   a first member of the pair of opposing dog ears having a pivot hole to receive an axle projection from a second identical hollow tubular shaft dog ear;
   said first member of the pair of opposing dog ears also having a lock bridge which is removably received by a hole in a second identical hollow tubular shaft in its second member of its pair of dog ears;
   said second identical hollow tubular shaft having its first member of its pair of dog ears with said axle projection which is received by the pivot hole of the first hollow tubular shaft's dog ear and having a lock bridge which is received by a hole in the second member of the pair of opposing dog ears in the first hollow tubular shaft;
   wherein no other axle support exists but for the two axle projections;
   a spring biasing said first and second hollow tubular members apart, and squeezing the opposing axle projections releases each lock bridge from its hole in its adjacent dog ear;
   wherein the first and second hollow tubular shafts can be moved to any desired angle from 0° to 180° including closed; and
   wherein moving the first and second hollow tubular shafts can be locked at a 180° angle by the lock bridges being seated in their holes.

3. A hinge for joining a first rod to a second rod, the hinge comprising:
   a first hollow tubular shaft having an opening for the first rod;
   said first hollow tubular shaft having a pair of opposing dog ears at an opposite end from the opening;
   a first member of the pair of opposing dog ears having a pivot hole to receive an axle projection from second identical hollow tubular shaft dog ear;
   said first member of the pair of opposing dog ears also having a lock bridge which is removably received by a hole in a second identical hollow tubular shaft in its second member of its pair of dog ears;
   said second identical hollow tubular shaft having its first member of its pair of dog ears with said axle projection which is received by the pivot hole of the first hollow tubular shaft's dog ear and having a lock bridge which is received by a hole in the second member of the pair of opposing dog ears in the first hollow tubular shaft;
   wherein no other axle support exists but for the two axle projections;
   a spring biasing said first and second hollow tubular members apart, and squeezing the opposing axle projections releases each lock bridge from ifs hole in its adjacent dog ear;
   wherein the first and second hollow tubular shafts can be moved to any desired angle between 0° and 180° including closed; and
   wherein moving the first and second hollow tubular shafts can be locked at a 90° angle by the lock bridges being seated in their holes, due to the lock bridges being located at a midpoint of its respective dog ear and the opposing dog ear having its hole located at the midpoint of its dog ear.

4. The apparatus of claim 2, wherein the spring has legs reaching inside the opposing hollow tubular shafts to bias the shafts open.

5. The apparatus of claim 2, wherein the spring has legs reaching inside the opposing hollow tubular shafts to bias the shafts closed.

6. The apparatus of claim 3, wherein the spring has legs reaching inside the opposing hollow tubular shafts to bias the shafts open.

7. The apparatus of claim 3, wherein the spring has legs reaching inside the opposing hollow shafts to bias the shafts closed.

8. The apparatus of claim 2, wherein each hollow tubular shaft has its opening offset from a base forming the pair of dog ears so as to provide an axial alignment along a longitudinal axis passing through the first and second hollow tubular shafts in the open 180° position.

9. The apparatus of claim 3, wherein each hollow tubular shaft has its opening offset from a base forming the pair of dog ears so as to provide an axial alignment along a longitudinal axis passing thru the first and second hollow tubular shafts in the open 180° position.

10. The apparatus of claim 4, wherein each hollow tubular shaft has its opening offset from a base forming the pair of dog ears so as to provide an axial alignment along a longitudinal axis passing thru the first and second hollow tubular shafts in the open 180° position.

11. The apparatus of claim 5, wherein each hollow tubular shaft has its opening offset from a base forming the pair of dog ears so as to provide an axial alignment along a longitudinal axis passing thru the first and second hollow tubular shafts in the open 180° position.

12. The apparatus of claim 6, wherein each hollow tubular shaft has its opening offset from a base forming the pair of dog ears so as to provide an axial alignment along a longitudinal axis passing thru the first and second hollow tubular shafts in the open 90° position.

13. The apparatus of claim 7, wherein each hollow tubular shaft has its opening offset from a base forming the pair of dog ears so as to provide an axial alignment along a longitudinal axis passing thru the first and second hollow tubular shafts in the open 90° position.

* * * * *